(12) United States Patent
De Angelis

(10) Patent No.: US 7,129,900 B2
(45) Date of Patent: Oct. 31, 2006

(54) METER ANTENNA

(75) Inventor: Robert Hugo De Angelis, Burnaby (CA)

(73) Assignee: Tantalus Systems Corp., Vancouver (CA)

( * ) Notice: Subject to any disclaimer, the term of this patent is extended or adjusted under 35 U.S.C. 154(b) by 62 days.

(21) Appl. No.: 10/656,279

(22) Filed: Sep. 8, 2003

(65) Prior Publication Data

US 2005/0052328 A1    Mar. 10, 2005

(51) Int. Cl.
*H01Q 1/04* (2006.01)
*H01Q 1/24* (2006.01)

(52) U.S. Cl. ................ 343/719; 343/702; 455/405

(58) Field of Classification Search ........... 343/895, 343/700 MS, 873, 743, 702, 719, 770, 769, 343/859, 746, 767; 361/667; 340/870.02; 455/405
See application file for complete search history.

(56) References Cited

U.S. PATENT DOCUMENTS

| | | | | |
|---|---|---|---|---|
| 3,641,576 A * | 2/1972 | Farbanish | ........... | 343/743 |
| 5,056,107 A * | 10/1991 | Johnson et al. | ........... | 375/138 |
| 5,479,182 A * | 12/1995 | Sydor | ........... | 343/895 |
| 5,583,492 A * | 12/1996 | Nakanishi et al. | ........... | 340/870.02 |
| 5,621,419 A * | 4/1997 | Meek et al. | ........... | 343/770 |
| 5,677,698 A | 10/1997 | Snowdon | | |
| 5,774,328 A * | 6/1998 | Rector et al. | ........... | 361/667 |
| 5,818,390 A * | 10/1998 | Hill | ........... | 343/700 MS |
| 5,847,683 A | 12/1998 | Wolfe et al. | | |
| 5,966,101 A | 10/1999 | Haub et al. | | |
| 5,977,931 A | 11/1999 | Openlander | | |
| 6,043,786 A | 3/2000 | Vannatta et al. | | |
| 6,067,052 A | 5/2000 | Rawles et al. | | |
| 6,072,991 A * | 6/2000 | Paul et al. | ........... | 455/73 |
| 6,091,358 A * | 7/2000 | Maniscalco et al. | ........... | 342/357.1 |
| 6,098,547 A * | 8/2000 | West | ........... | 102/214 |
| 6,181,294 B1 * | 1/2001 | Porter et al. | ........... | 343/859 |
| 6,218,995 B1 * | 4/2001 | Higgins et al. | ........... | 343/719 |
| 6,304,227 B1 * | 10/2001 | Hill et al. | ........... | 343/769 |
| 6,304,231 B1 * | 10/2001 | Reed et al. | ........... | 343/873 |
| 6,339,400 B1 * | 1/2002 | Flint et al. | ........... | 343/702 |
| 6,414,647 B1 | 7/2002 | Lee | | |
| 6,483,466 B1 | 11/2002 | Liu | | |
| 6,507,322 B1 | 1/2003 | Fang et al. | | |
| 6,545,640 B1 | 4/2003 | Herve | | |
| 6,819,292 B1 * | 11/2004 | Winter | ........... | 343/702 |
| 2004/0104853 A1 * | 6/2004 | Chen | ........... | 343/702 |

OTHER PUBLICATIONS

Smith, Kent, Antennas For Low Power Applications, RF Monolithics Inc. Application Note, AN-36, 1998.
Jasik, Henry (editor), Antenna Engineering Handbook, McGraw-Hill, N.Y. 1961, pp. 8-1 thru 8-16.
Smart Antenna Systems, Web ProForum Tutorials, International Engineering Consortium.

* cited by examiner

*Primary Examiner*—Hung Vy
*Assistant Examiner*—Hung Tran Vy

(57) ABSTRACT

The antenna configuration presented is an integral component of a retrofit module designed to incorporate a data telemetry transceiver within the confines of a utility meter.

15 Claims, 6 Drawing Sheets

METER ANTENNA

A portion of the disclosure of this patent document contains material which is subject to copyright protection. The copyright owner has no objection to the facsimile reproduction by anyone of the patent document or the patent disclosure as it appears in the Patent and Trademark Office file of records, but otherwise reserves all copyright rights whatsoever.

FIELD OF THE INVENTION

This invention relates to antennas for use with utility meters.

BACKGROUND OF THE INVENTION

Antenna performance parameters such as efficiency, radiation/reception pattern, and resonant frequency are affected when the antenna is placed in the vicinity of metallic infrastructures. The incumbent or resident metallic infrastructures in conventional electromechanical utility meters (such as GE Watthour Meter I-70-S and ABB AB-1) greatly affect the performance parameters of conventional half-wave dipole or quarter-wave whip antennas when such antennas are incorporated within the confines of a conventional meter. The interactions between the metallic infrastructure in a conventional meter and such conventional antennas are highly sensitive in the sense that the difference in the metallic infrastructures themselves between different meter models is sufficient to cause inconsistent antenna performance. The goal of the invention is to increase the stability and efficiency of antenna performance over many meter types.

SUMMARY OF THE INVENTION

There is provided an antenna arrangement for a conventional utility meter having a cover and metallic infrastructure plus RF communications capability, comprising a slot antenna formed to fit under the cover and cooperating with said RF communications capability.

There is also provided a method of managing the varying effects of differing incumbent metallic infrastructures on the performance of a radiating/receiving element of an antenna, comprising the steps of inserting a metallic structure closer to the radiating/receiving element than the incumbent metallic infrastructure.

BRIEF DESCRIPTION OF THE DRAWINGS

A better understanding of the present invention can be obtained when the following detailed description of the preferred embodiment is considered in conjunction with the following drawings, in which.

Figure 1:
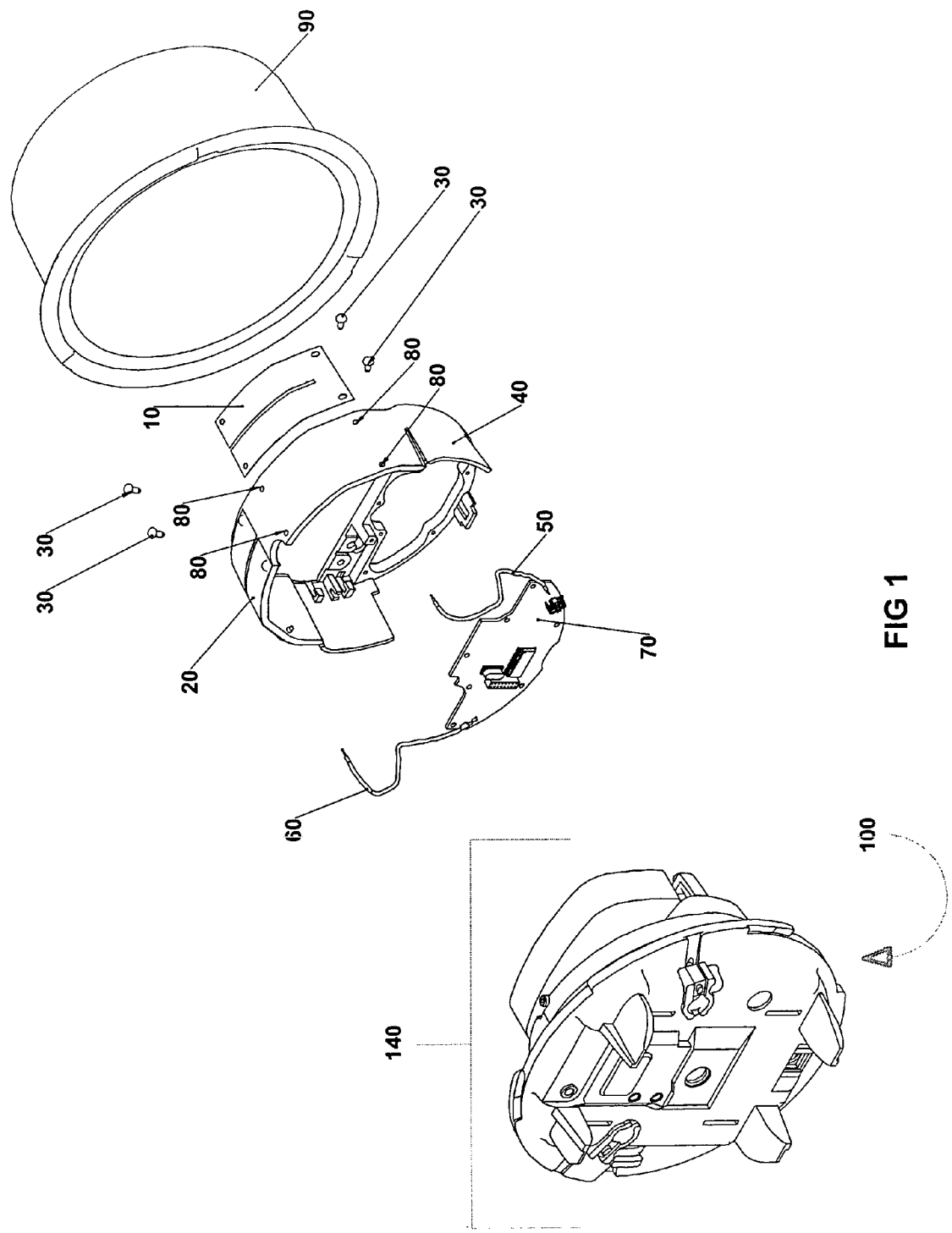
FIG. 1 shows an exploded view of a RF retrofit module with the slot antenna of the present invention.

All drawings are drawn for ease of explanation of the basic teachings of the present invention only; the extensions of the drawings with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, RF performance and similar requirements will likewise be within the skill of the art after the following teachings of the present invention have been read and understood.

Where used in the various drawings, the same numerals designate the same or similar parts. Furthermore, when the terms "top", "bottom", "first", "second", "inside", "outside", "edge", "side", "front", "back", "length", "width", "inner", "outer", and similar terms are used herein, it should be understood that these terms have reference only to the structure shown in the drawings as it would appear to a person viewing the drawings and are utilized only to facilitate describing the invention.

DETAILED DESCRIPTION OF THE PREFERRED EMBODIMENT

Figure 2:
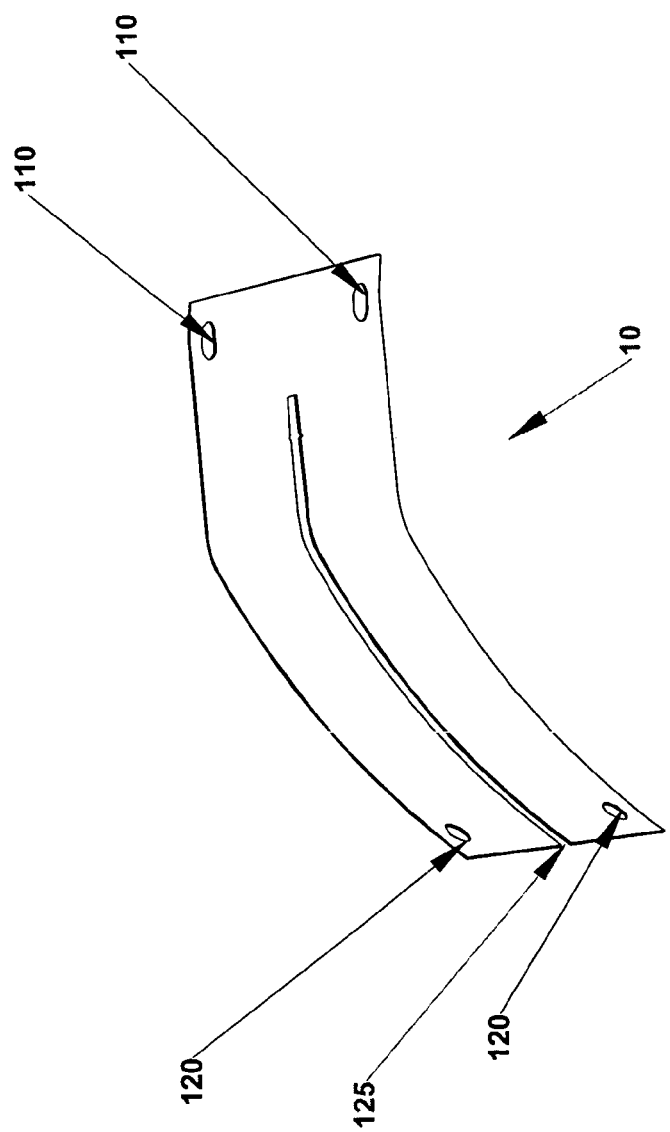
FIG. 2 shows the slot antenna of the present invention, formed to the contour of the RF retrofit module.

With reference to FIGS. 1 and 2, a conventional meter 100 houses electromechanical (incumbent or resident) metallic infrastructures (consisting of gears, brackets, prongs, tumblers, disks, rivets and the like, identified generally as 140) enclosed by a transparent (typically glass or plastic) cover 90. Herein, the term "metallic infrastructure" is meant to describe the (resident or incumbent) metallic infrastructure 140 whereas the term "metallic structure" is meant to describe the contribution of the present invention.

Figure 5:
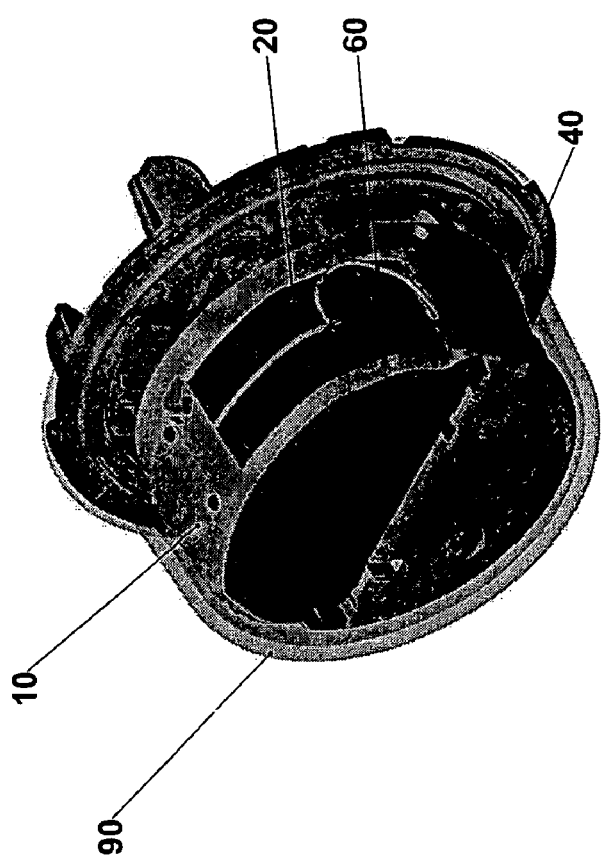
FIG. 5 shows a front perspective, partially broken away view of a meter with the RF retrofit module that includes the antenna invention installed.
Figure 6:
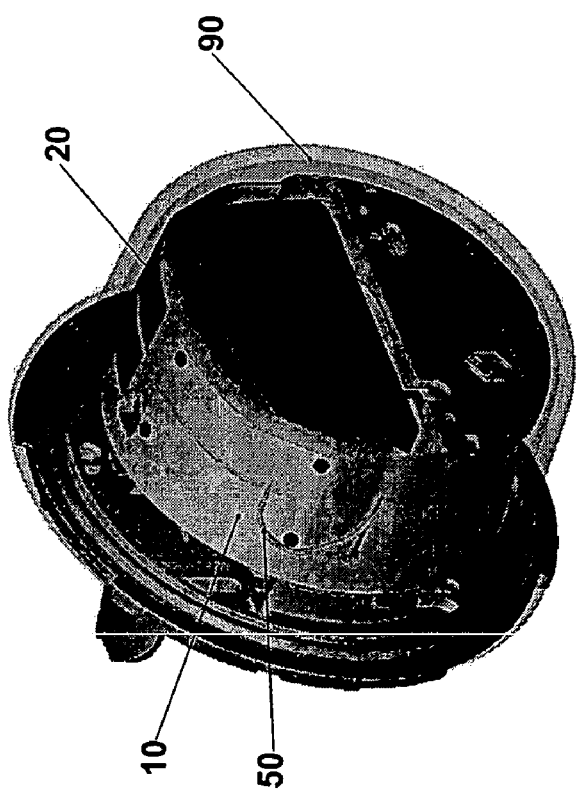
FIG. 6 shows a view complementary to that of FIG. 5.

As seen in FIGS. 1 and 2, the present invention teaches the use of a slot antenna 10 and 20 with a RF retrofit module 40 that is placed within meter 100 under the cover 90. RF retrofit module 40 has transceiver assembly 70 and is shaped to be attached to the resident metallic infrastructure 140 of meter 100. Details of quarter-wave slot 125 in antennas 10 and 20 are explained below. The fully assembled version of the exploded view of FIGS. 1–2, is shown in FIGS. 5–6.

Those skilled in the art realize that an efficient antenna that is insensitive to meter incumbent metallic infrastructures placed in its vicinity, faces conflicting requirements. In the present invention, the quarter-wave radiating/receiving RF slot 125 is inherently adjacent to the metallic structure of brass sheet 115 it is cut out of. Thus the metallic infrastructure 140 of the conventional meter 100 is (compared to the metallic structure of brass sheet 115) relatively "far" away from the slot 125, resulting in an antenna that is less sensitive to de-tuning when compared to the aforementioned conventional antennas.

Cover 90 is typically frusto-conical (as the result of conventional manufacturing processes). RF retrofit module 40 is pre-formed and shaped accordingly as a smaller frusto-cone to fit under cover 90. The brass sheet 115 of antennas 10 and 20 is required to fit snugly over the frusto-cononical outer surface of RF retrofit module 40 and under cover 90, as seen in FIGS. 1,4–6 and so is correspondingly frusto-conical itself and is dimensioned to fit over as much of the outer surface RF retrofit module 40 as physically allowed thereby under cover 90.

Mounting holes 110 and 120 in antennas 10 and 20 are elongated to allow for thermal expansion and contraction over the expected operating temperature range of the antennas 10 and 20. Antenna 10 is attached to the RF retrofit module 40 with four plastic rivets 30 inserted through the mounting holes 110 and 120 in FIG. 3 and through the corresponding mounting holes 80 in the RF retrofit module 40. The plastic rivets 30 are heat-staked to complete the fastening.

Antenna 10 is pre-formed to snugly fit the contour of part of the outer surface of the RF retrofit module 40 as shown in FIG. 2. In the same fashion the complementary, preformed antenna 20 is attached to another part of the outer surface of the RF retrofit module 40. Antenna 10 is coupled to the transceiver assembly 70 via coaxial cable 50, Coaxial cable 50 is soldered to the transceiver assembly 70 at a transceiver coupling point. The other end of coaxial cable 50 is soldered to antenna 10 as per the detail A in FIG. 3 at points 130. In the same fashion antenna 20 is coupled to the transceiver assembly 70 via coaxial cable 60. The fully assembled RF retrofit module 40 is fastened to meter 100 (by conventional means like screws or snap/friction fit) and enclosed by the cover 90.

The RF radiation/reception pattern of antenna 10 is perturbed to some degree when incorporated into the meter 100. Accordingly, in the preferred embodiment, two slot antennas 10 and 20 are used and are placed offset from the center of the outer surface of the retrofit module 40 as explained above. The resultant dominant null in the RE radiation/reception pattern for each of antennas 10 and 20 occurs at different azimuths such that one antenna mitigates the null of the other. The selection of antenna 10 and 20 is conventionally performed by the transceiver assembly 70 where the selection is made by assessing the quality of the received signal for each antenna in the actual operating environment. As such, a switched-diversity antenna is implemented. Alternatively, as a function of the capabilities of transceiver assembly 70, both antennas 10 and 20 may be active to perform transceive functions.

Antenna 10 and 20 are made of hard brass material of about 8 mil thickness. The brass material is selected for its oxidation and solderability properties that are favourable for the environment which the antennas are intended to operate in (e.g. hot and humid climates which would result in considerable heat and humidity under cover 90). In other environments, copper and stainless steel would suffice, as a matter of routine design choice.

Figure 3:
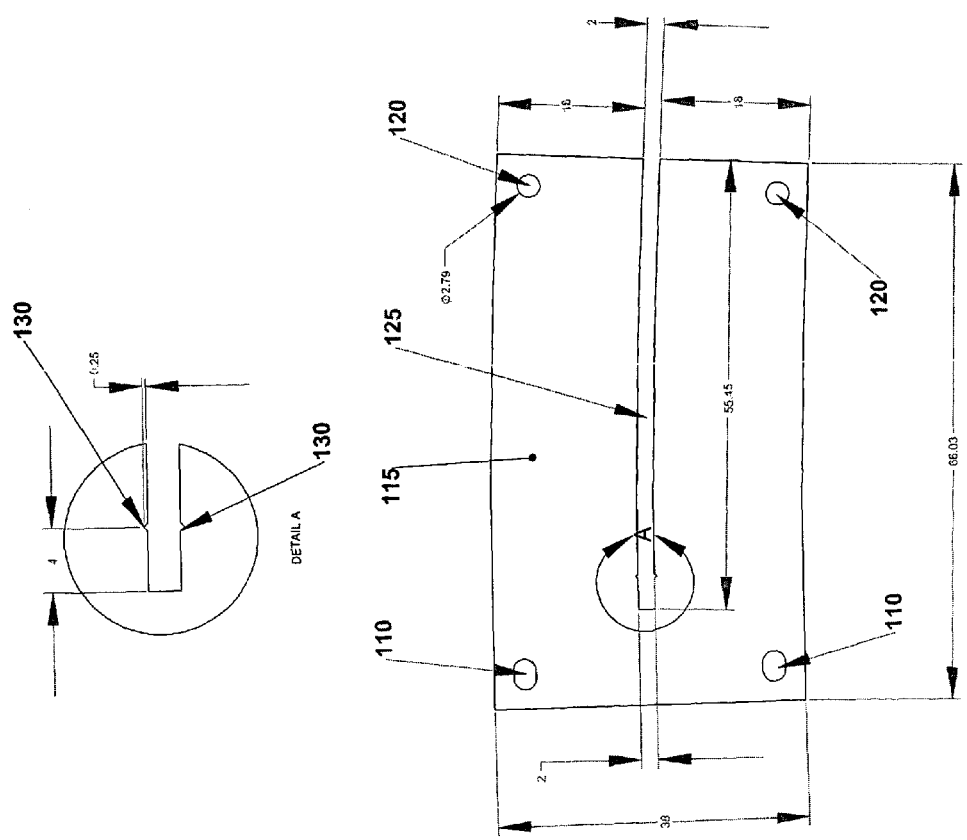
FIG. 3 shows the actual dimensions of the slot antenna of the preferred embodiment.
Figure 4:
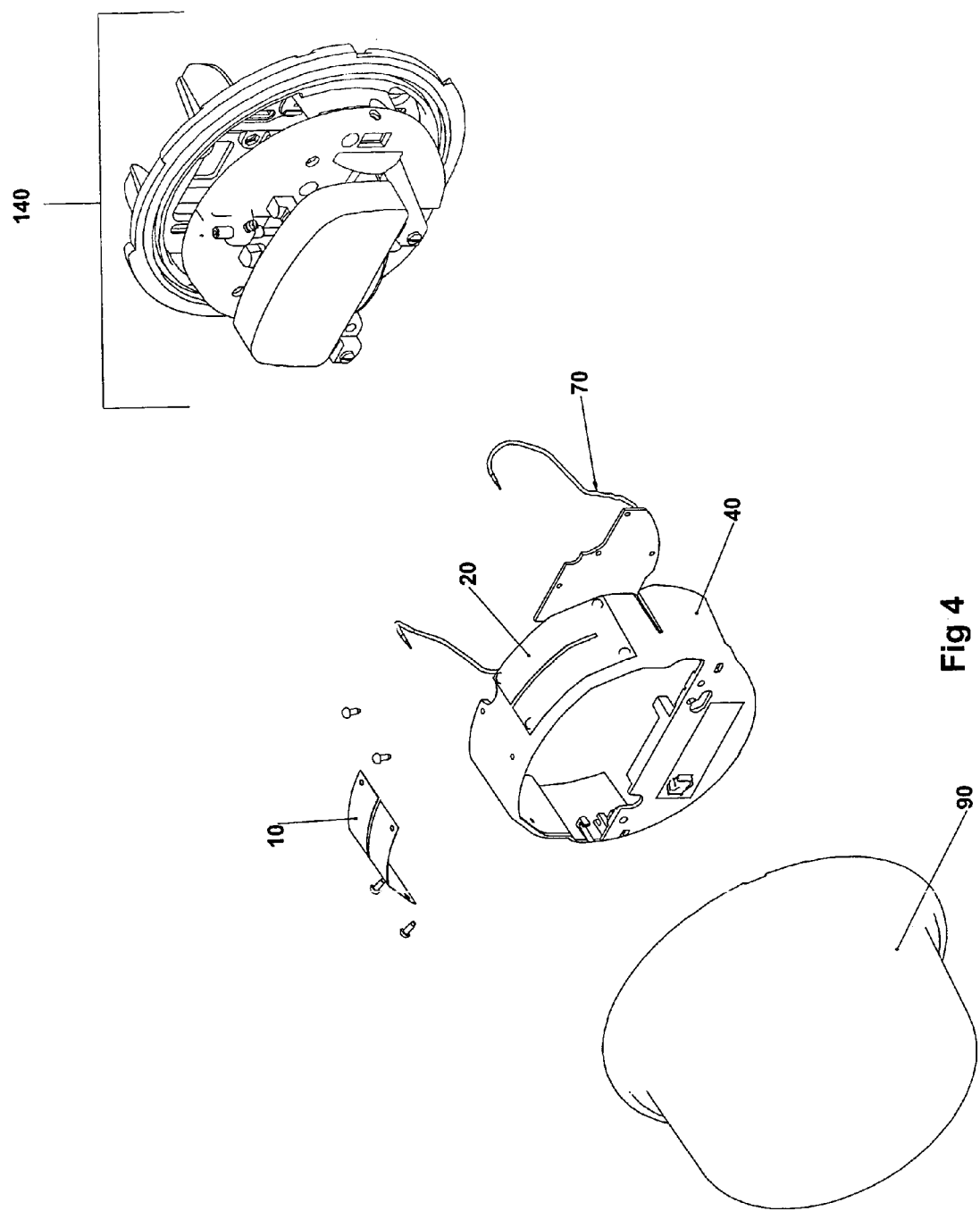
FIG. 4 shows a view complementary to that of FIG. 1.

FIG. 3 shows the dimensions of antenna 10 (including those of slot 125) in millimeters for a resonant frequency of 915 MHz in the preferred embodiment, with details on the coupling points that gives the best return loss in a 50 ohm system. Those skilled in the art could scale the dimensions to operate at other frequencies for maximum effectiveness.

RF retrofit module 40 has a housing or frame made of polycarbonate plastic or other like material with dielectric properties that may be advantageous (e.g. fibreglass). RF Retrofit module 40 has transceiver assembly 70 placed as far away as possible relative to the slot antenna 10 and 20.

An alternative embodiment of the invention (not shown) uses one single slot antenna. The dimensions of this alternative antenna would remain about the same as for antenna 10 or 20 but its location on the surface of the RF retrofit module 40 would change so that the (longitudinal) center of its slot 125 would align with the top or twelve o'clock position of the RF retrofit module 40 and accordingly that of the meter 100.

An alternative embodiment of the invention (not shown) uses three slot antennas, appropriately sized, to cover the available surface area of the RF retrofit module 40. Depending on the intended application and environment, three antennas are identical in size and shape and are equi-spaced and uniformly orientated on the surface area of RF retrofit module 40, or they may be of differing sizes, shapes and orientations. The variations can be accomplished easily by the empirical means (e.g. experimentation for the intended application and environment with consequent design (of shape, size, orientation)).

For these alternative (single or more than two slot antennas) embodiments, the transceiver assembly 70 of the preferred embodiment (for two antennas 10 and 20), and any upstream application, would be adapted and programmed conventionally to accommodate the single path or the switching of the multiple antenna paths, as the case may be.

Although the preferred and alternative embodiments have been given in the context of a conventional utility meter, the present invention is not limited to such contexts. The present invention teaches that incumbent or resident metallic infrastructures which are problematic because they vary from (conventional meter) model to model, can be substantially "tamed" by inserting a metallic structure that becomes more "dominant" than the incumbent or resident "adjacent" metallic infrastructure because of its closer proximity to the RF radiating/receiving element of the subject antenna. This more "dominant" metallic structure is more manageable than the varying incumbent or resident metallic infrastructures because its effects are more uniform and thus predictable.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for use with differing metallic electromechanical infrastructures of resource-measuring meters, to minimize the effects on the performance of a first RF radiating/receiving element located within one such infrastructure due to its interactions with said such one infrastructure, comprising the step of placing a first metallic structure physically closer to said first RF radiating/receiving element than said such one infrastructure is, wherein said placed first metallic structure is RF radiating/receiving material and said first RF radiating/receiving element is a slot formed in said material, thereby forming a first slot antenna.

2. The method of claim 1, comprising the additional step of placing a second metallic structure physically closer to a second RF radiating/receiving element than said such one infrastructure is, wherein said placed second metallic structure is RF radiating/receiving material and said second RF radiating/receiving element is a slot formed in said material, thereby forming a second slot antenna.

3. The method of claim 2, wherein said placing of first and second metallic structures is performed to effect cooperative RF performance of said first and second antennas.

4. The method of claim 3, wherein the cooperative performance is achieved by locating said first and second antennas so that the dominant null of the RF radiating/receiving element of one antenna is mitigated by the RF radiating/receiving element of the other antenna.

5. The method of claim 4, wherein said placing of first metallic structure includes (a) the supporting of said first metallic structure with a supporter having dielectric properties that do not adversely affect the performance of said first RF radiating/receiving element and (b) the shaping of said supporter to maximize the amount of surface space for supporting said first metallic structure.

6. A method of retrofitting a resource-measuring unit having a metallic infrastructure of prongs, brackets, rivets and metallic elements, with RF telemetry functionality, comprising the steps of:
   (a) providing RF functionality with a first RF radiating/receiving element within said infrastructure; and
   (b) placing a first metallic structure physically closer to said first RF radiating/receiving element than said infrastructure is,
   wherein said placed first metallic structure is radiating/receiving material and said first RF radiating/receiving element is a slot formed in said material, thereby forming a first slot antenna.

7. The method of claim 6, further comprising the step of:
   (c) placing a second metallic structure physically closer to said second RF radiating/receiving element than said infrastructure is.

8. The method of claim 7, wherein said placed second metallic structure is radiating/receiving material and said second RF radiating/receiving element is a slot formed in said material, thereby forming a second slot antenna.

9. The method of claim 8, wherein said RF functionality activates one or the other of, or both, said first and second slot antennas.

10. An RF telemetry unit for use with differing metallic electromechanical infrastructures of resource-measuring meters, comprising:
   (a) a first RF radiating/receiving element locatable within one such infrastructure; and
   (b) a first metallic structure placed physically closer to said first RF radiating/receiving element than any said one such infrastructure is, wherein said first metallic structure is RF radiating/receiving material and said first RF radiating/receiving element is a slot formed in said material, thereby forming a first slot antenna.

11. The unit of claim 10, further comprising:
   (d) a second RF radiating/receiving element;
   (e) a second metallic structure placed physically closer to said second RF radiating/receiving element than said one such infrastructure is, wherein, wherein placed second metallic structure is RF radiating/receiving material and said second RF radiating/receiving element is a slot formed in said material, thereby forming a second slot antenna.

12. The unit of claim 11, wherein said first and second metallic structures are located to effect cooperative RF performance of said first and second antennas.

13. The unit of claim 12, wherein the cooperative performance is achieved by locating said first and second antennas so that the dominant null of the radiating/receiving element of one antenna is mitigated by the radiating/receiving element of the other antenna.

14. The unit of claim 13, wherein the meter has a cover and said first antenna is located under said cover.

15. The unit of claim 14, wherein the first metallic structure includes a supporter therefor, having dielectric properties that do not adversely affect the performance of the radiating/receiving element, and the supporter is shaped to maximize the amount of surface space available for supporting said first metallic structure.

* * * * *